No. 799,136. PATENTED SEPT. 12, 1905.
H. BEZER.
ELECTRICALLY CONTROLLED MOTOR.
APPLICATION FILED SEPT. 4, 1901.
3 SHEETS—SHEET 1.
Fig. 1,
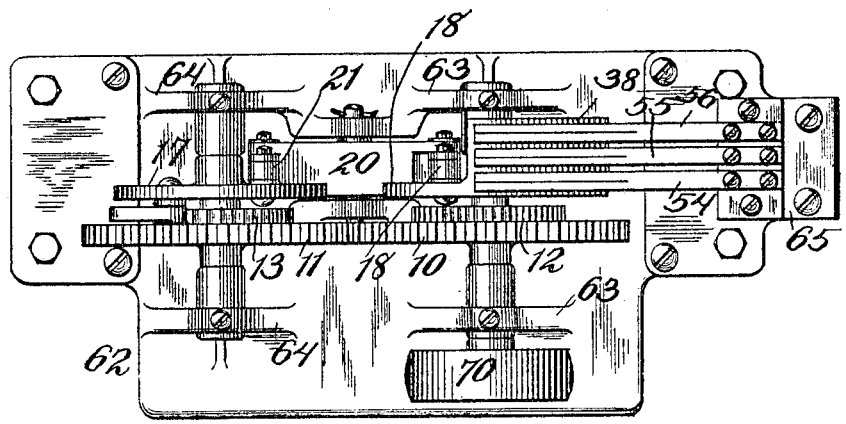
Fig. 3,
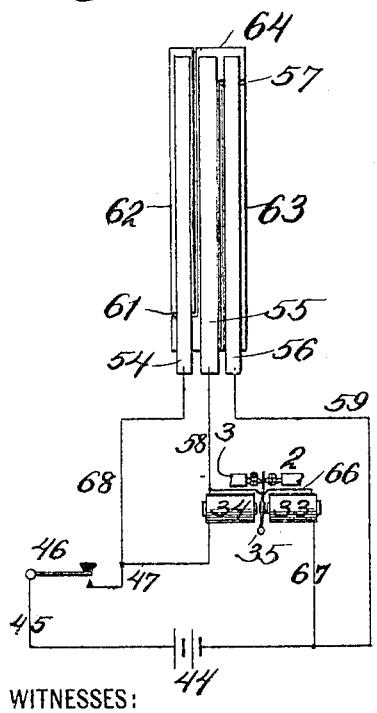
Fig. 4,
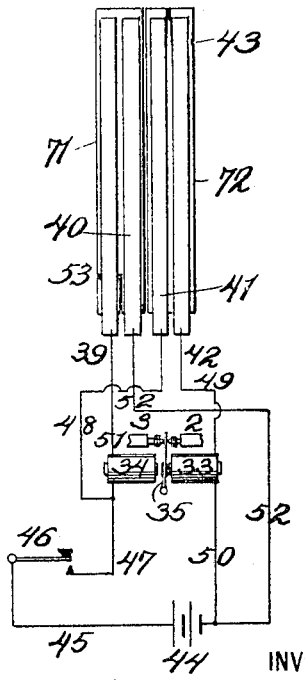
WITNESSES:
Harry Goss.
Henry Barnes
INVENTOR
Henry Bezer
BY
Henry D. Williams
ATTORNEY

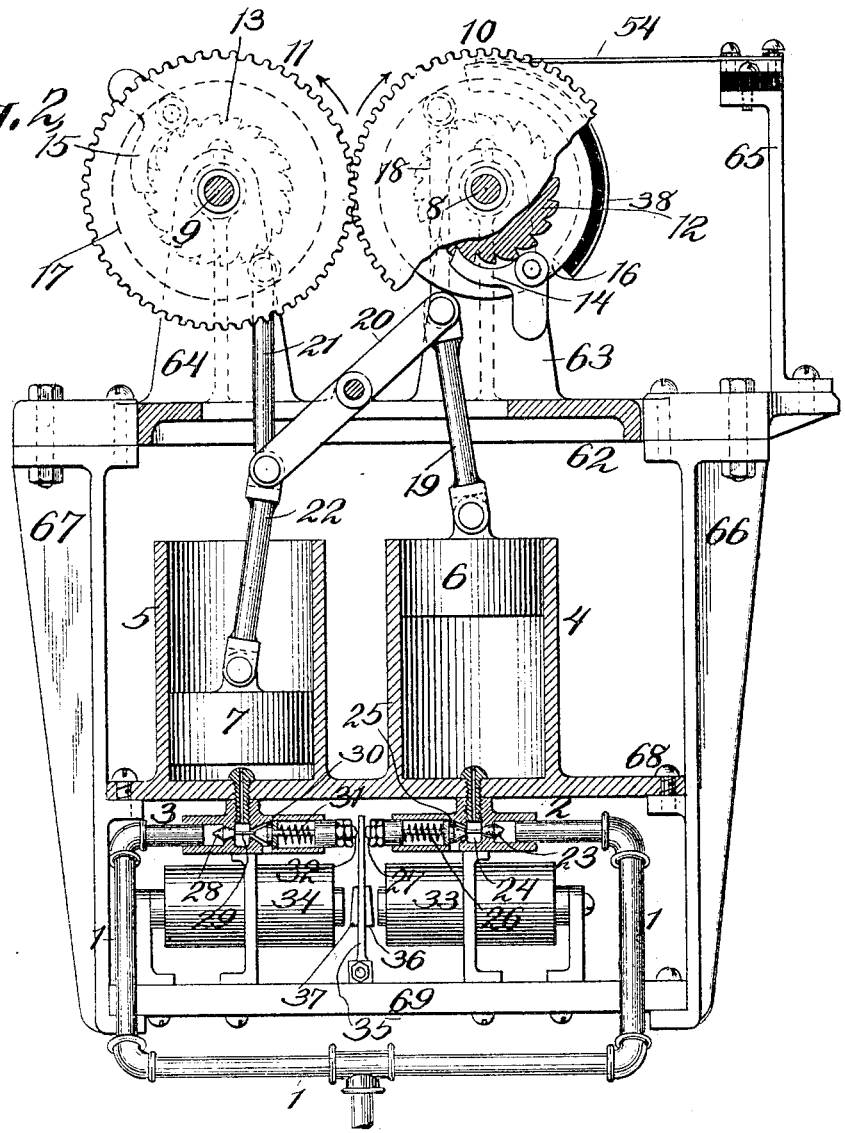

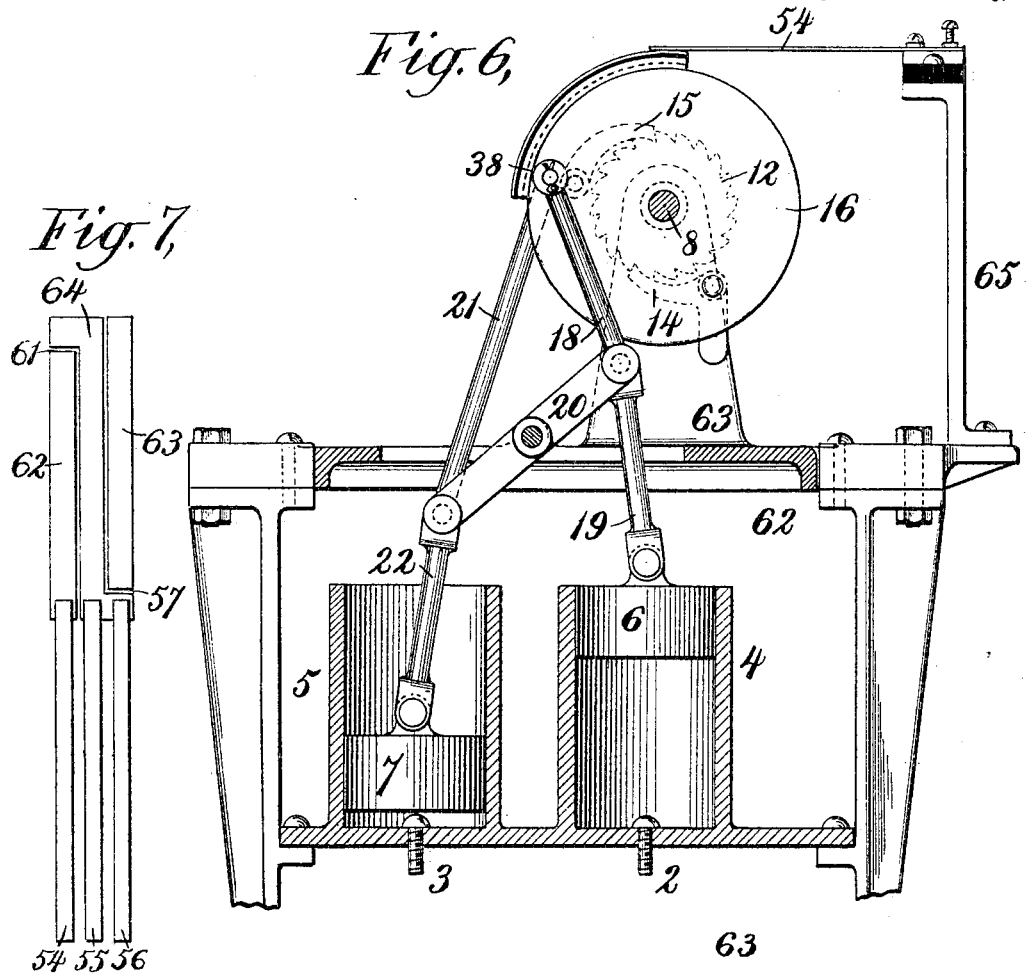
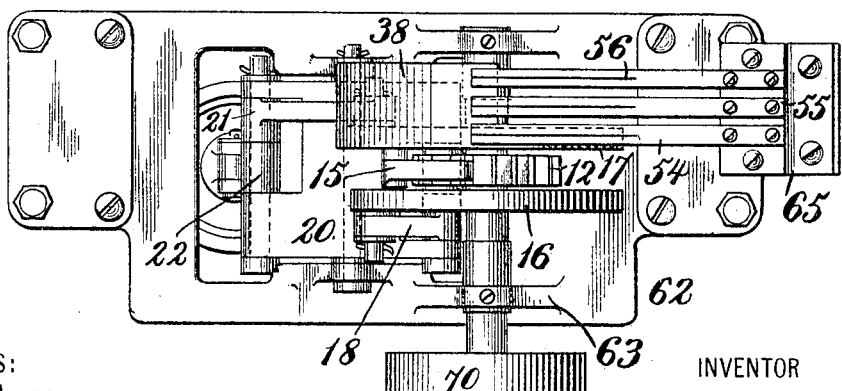

UNITED STATES PATENT OFFICE.

HENRY BEZER, OF WESTFIELD, NEW JERSEY.

ELECTRICALLY-CONTROLLED MOTOR.

No. 799,136. Specification of Letters Patent. Patented Sept. 12, 1905.

Application filed September 4, 1901. Serial No. 74,340.

*To all whom it may concern:*

Be it known that I, HENRY BEZER, a subject of the King of Great Britain, residing at Westfield, in the county of Union and State of New Jersey, have invented certain new and useful Improvements in Electrically-Controlled Motors, of which the following is a specification, reference being had therein to the accompanying drawings, forming part hereof.

My invention relates to electrically-controlled motors in which a reciprocating movement produced by a motive medium is changed into a rotary movement, and the motor embodying my invention hereinafter described is particularly adapted for actuating railway signaling-semaphores and other appliances wherein the actuation of the motor is controlled from a distant point and wherein reliability of action is of prime importance.

My invention consists in the provision of simple and reliable electromagnetic means for controlling the motive medium, and thereby positively controlling the operation of the motor so as to start and stop the motor, and in the provision of such electromagnetic controlling means for starting the motor from any position and stopping the motor at any time and in any position.

My invention further consists in various improvements in the controlling-valves and their combinations with the electromagnetic controlling means and in circuit make and break devices controlled by the movements of the parts actuated by the prime movers and in various improvements in construction and combinations of parts.

My invention has for its objects reliability of action, uniform and continuous application of power, adaptability to slow movement at the shaft or rotary part in which the rotary movement is directly produced, the elimination of dead-centers and capability to start in any position and stop at any position, and other objects which will appear from the following description of the motor embodying my invention illustrated in the accompanying drawings.

I will now particularly describe the construction and operation of such motor and will thereafter point out my invention in claims.

Figure 1 is a plan view of a motor embodying my invention. Fig. 2 is a front elevation of the same, partly in section. Fig. 3 is a diagrammatic view showing a development of the commutator and showing the circuit connections. Fig. 4 is a similar view of a modified construction of commutator and arrangement of circuits. Fig. 5 is a plan view of a motor of modified construction. Fig. 6 is a front elevation of the same, partly in section. Fig. 7 is a development of the commutator shown in Figs. 5 and 6.

The motor shown in the drawings is designed for the employment of a gas under pressure as the motive medium, and more particularly for the employment of compressed carbon dioxid supplied by the evaporation and expansion of liquid carbon dioxid under the control of well-known means for supplying such gas under a constant predetermined pressure. The prime movers shown are pistons working in cylinders, and in the constructions shown two of such prime movers are provided. The compressed gas or other motive medium enters through the conduit 1, this conduit dividing into two branches, one branch to each of two controlling-valves 2 3. Each of these valves controls the intake and exhaust of a cylinder, the valve 2 of the cylinder 4 and the valve 3 of the cylinder 5. Each cylinder is closed at one end and open at the other and has a piston working therein, the cylinder 4 having the piston 6 and the cylinder 5 having the piston 7, the ducts or passages from the valves entering the cylinders at their closed ends. The pistons are valveless and single-acting, being moved upwardly by the pressure of the compressed gas.

In the construction shown in Figs. 1 to 3, inclusive, two driving-shafts are provided, rotating in opposite directions, and the power may be taken from either one of these two shafts, each being a rotating part receiving a continuous rotary movement from the reciprocating movement of the prime movers. As shown, provision is made for taking power from the right shaft 8 by means of a pulley 70. The right driving-shaft 8 is located above the cylinder 4 and the left driving-shaft 9 above the cylinder 5, and the two driving-shafts are connected together, this connection being shown as effected by intermeshing spur-gears 10 11. Each driving-shaft is provided with a driving ratchet-wheel, these driving ratchet-wheels 12 and 13, respectively, being shown as formed upon or secured to the respective connecting-gears. A weighted pawl is provided for each ratchet-wheel, the pawl 14 for the ratchet-wheel 12 and the pawl 15 for the ratchet-wheel 13, and each pawl is carried by a disk pivoted to oscillate upon its corresponding driving-shaft, the disk 16 on the right driving-shaft 8 and the disk 17 on the left driving-shaft 9. Each disk is connected to a piston by a jointed connection or connecting-rod, the right disk 16 having pivotally connected at one end thereof the part connecting-rod 18 and the corresponding piston 6 having pivotally connected at one end thereof the part connecting-rod 19 and the part connecting-rods being jointed together and to the right end of a cross-lever 20, the cross-lever 20 being fulcrumed at a fixed point and shown as pivoted on the frame. The left disk 17 has pivotally connected to it at one end the part connecting-rod 21, and the corresponding piston 7 has pivotally connected to it at one end the part connecting-rod 22, and the two part connecting-rods 21 and 22 are jointed together and at the left end of the cross-lever 20, the two jointed connecting-rods being thus connected to opposite ends of the cross-lever. The function of the cross-lever is to control the relative movements of the pistons and to compel the pistons to move at all times in opposite phases, so that upon the completion of the upward stroke of one piston the other piston will be ready to commence its upward stroke, and vice versa, thus insuring a continuous application of the power of the motive medium. It has the further function of forcing the return movement of each piston, thus insuring complete movements and permitting tight packing of the pistons. During the upward stroke of each piston the corresponding pawl drives its ratchet-wheel, while during the downward stroke of each piston the corresponding pawl is returned to the position occupied by it at the beginning of the preceding stroke, and thus the disks and pawls receive an oscillating movement, and the pawls successively impart forward movement to the driving-shafts, the forward movement imparted by one pawl operating both driving-shafts by reason of the connection of the two shafts.

Each controlling-valve is so constructed that the opening of the intake closes the exhaust and the opening of the exhaust closes the intake, this being shown as accomplished by providing a single stem for the intake and exhaust valves and locating their seats oppositely, so that the movement of the stem which opens one valve will close the other, and vice versa. As shown, the intake-valve 23 of the right cylinder 4 is carried on a stem 24, which also carries the exhaust-valve 25, and the intake-valve is held closed and the exhaust-valve open by a spring 26, and a projecting stem 27 is provided whereby the valve is actuated. The intake-valve 28 of the left cylinder 5 is on the same stem 29 with the exhaust-valve 30, and the spring 31 holds the intake-valve closed and the exhaust-valve open and the valve is actuated by the projecting stem 32. The actuation of these valves is accomplished through electromagnetic means, and to this end I provide two opposite controlling-electromagnets 33 and 34 and an armature-lever 35, the armature-lever carrying armatures 36 and 37, working between the opposite poles of the electromagnets. The upper end of the armature-lever is arranged so as to directly actuate the valve-stems 27 and 32 by pressure thereon, and the springs or resilient devices of the valves return the armature-lever to the normal position shown. I provide means for controlling the energization of these electromagnets so as to cause the desired movements of the valves, and to this end I provide a commutator 38, shown as an arc-shaped part carried on the right oscillating disk 16, and this commutator 38 has conducting-plates upon its surface and coöperates with commutator-brushes. In the construction of commutator shown in Figs. 1 and 3 I provide three commutator-brushes, and in the construction of commutator shown in Fig. 4 I provide four commutator-brushes. The framework is shown as comprising a bed-plate 62, from which project upwardly standards 63 and 64, containing the bearings for the driving-shafts, and to which is secured the bracket 65 for the commutator-brushes. Hangers 66 and 67 are provided, secured to and extending down below the bed-plate, these hangers supporting a cross-plate 68, having the cylinders 4 and 5 in one piece therewith and also carrying a lower base-plate 69, of stone or other insulating material, on which are supported the electromagnets 33 and 34 and the bearings for the armature-lever 35.

I will first describe the commutator and circuits of the main views of the drawings, and will refer particularly to Fig. 3, which shows a development of the commutator and shows the circuits diagrammatically. The commutator 38 is shown in the position which it occupies at the completion of the upstroke of the right-hand piston 4; but the circuits are shown as normally open at the controlling-switch 46, and therefore the controlling-electromagnets are deënergized and the armature-lever is in normal position with both intake-valves closed and both exhaust-valves open. When the commutator is in any intermediate position with the brushes on any line between the breaks 57 and 61, the outer brushes 54 and 56 are in contact with dead-plates 62 and 63, respectively, of the commutator, and the middle brush 55 is the only brush in contact with the main plate 64 of the commutator. Therefore no circuits are closed at the commutator. The electric current will then flow from the battery directly through both electromagnets in series, as follows: from battery 44, through wire 45, controlling-switch 46, (shown in open condition,) wire 47, left electromagnet 34, wire 66, right electromagnet 33, and wire 67 back to battery. With both electromagnets thus energized the armature will be oppositely attracted thereby. I provide that the normal position of the armature-lever 35 shall be with one armature in closer proximity to the poles of its electromagnet than the other, and I have shown the right armature 36 as normally in closer proximity to the poles of its electromagnet 33 than the left armature, so that if the controlling-switch 46 is closed with the commutator in any intermediate position and both electromagnets are energized the pull of the right electromagnet 33 will preponderate and the armature-lever will be moved to the right, opening the intake-valve 23 of the right-hand cylinder 4. After the starting movement the energization of both electromagnets will cause the armature-lever 35 to be retained in either extreme position occupied by it at the commencement of such energization of both electromagnets, and I provide that just before each prime mover reaches its extreme position the electromagnet which has attracted and held its armature shall be deënergized, thereby permitting the other electromagnet to attract and hold its armature and moving the armature-lever to the other extreme position. For example, in the construction shown I provide that shortly before the commutator reaches the position shown—that is, shortly before the completion of the upstroke of the right piston 6—the right dead commutator-plate 63 will move clear of its commutator-brush 56 and the main commutator-plate 64 will come in contact with such brush, and will thereby close a shunt-circuit excluding the right electromagnet 33, thus deënergizing that electromagnet and permitting the left electromagnet 34 to attract and hold its armature, thereby moving the armature-lever 35 to extreme left position, permitting the intake-valve 23 of the right cylinder 4 to close and the exhaust-valve 25 thereof to open and opening the intake-valve 28 and closing the exhaust-valve 30 of the left cylinder 5. The short circuit thus closed proceeds from the left electromagnet 34, through wire 58, brush 55, main commutator-plate 64, brush 56, and wire 59. In like manner shortly before the commutator reaches its other extreme position the left dead-plate 62 moves clear of its brush 54 and the main commutator-plate 64 comes in contact with this brush, thereby closing a short circuit, excluding the left electromagnet 34, deënergizing this electromagnet, and causing the armature-lever 35 to be moved to extreme right position. The short circuit thus closed proceeds from wire 47 by wire 68, brush 54, main commutator-plate 64, brush 55, and wire 58 to wire 66.

In the modified construction of commutator and arrangement of circuits shown in Fig. 4 I provide that when the commutator is in intermediate position the two electromagnets are connected in multiple with the battery and there are four commutator-brushes, the two brushes 41 and 42 for the circuit of the right electromagnet 33 and the other two brushes 39 and 40 for the circuit of the left electromagnet 34. The circuit for the right electromagnet 33 is as follows: from battery 44 by wire 45, switch 46, wires 47 48, brush 41, right connecting-plate 72, brush 42, wire 49, right electromagnet 33, and wire 50 back to battery. The circuit for the left electromagnet 34 is as follows: from battery 44 by wire 45, switch 46, wire 47, left electromagnet 34, wire 51, brush 39, left connecting-plate 71, brush 40, and wire 52 back to battery. Shortly before the commutator reaches the extreme position shown the break 43 of the commutator passes under the brush 42, the right connecting-plate 70 passing clear of this brush, and thereby the circuit for the right electromagnet 33 is opened. Shortly before the commutator reaches the other extreme position the break 53 passes under the commutator-brush 39, and thereby the circuit for the left electromagnet 34 is opened.

In the modified construction of motor shown in Figs. 5, 6, and 7 a single driving-shaft 8 is shown, and both oscillating disks 16 and 17 are mounted concentrically with this driving-shaft free to rotate relatively thereto and a single ratchet-wheel 12 is engaged by both pawls 14 and 15, these pawls being arranged so that each is clear of the path of movement of the other. Jointed connecting-rods 18 19 and 21 22 and a cross-lever 20 are provided as in the construction heretofore described, but the upper parts of each connecting-rod are at a greater angle to the lower part connecting-rods to accommodate the concentric arrangement of the oscillating disks. The pistons, cylinders, valves, and electromagnetic valve-operating means are as already described, and the valves and valve-operating means are therefore not shown. The commutator 38 is here shown as on the disk actuated by the left piston 7, and this calls for a reversal in the arrangement of the commutator-plates, as illustrated in Fig. 7, and the circuit connections to the commutator-brushes 54, 55, and 56, are as heretofore described relative to Fig. 3, and are not therefore shown.

The construction and arrangement of the motion-transmitting means shown and above described are not claimed herein, but form the subject of a divisional application.

It is obvious that various modifications may be made in the construction shown and above described within the spirit and scope of my invention.

What I claim, and desire to secure by Letters Patent, is—

1. The combination of a plurality of prime movers adapted to receive reciprocating movement from a motive medium, a rotating part and connecting means whereby all of the prime movers cause rotation thereof in one direction only, a valve mechanism controlling the motive medium for all prime movers, electromagnetic controlling means for such valve mechanism, a circuit-controlling device actuated by the prime movers and controlling the electromagnetic means and thereby controlling the motive medium for all prime movers.

2. The combination of two prime movers adapted to receive reciprocating movement from a motive medium, a rotating part and connecting means whereby the two prime movers cause rotation thereof in one direction only, a valve mechanism controlling the motive medium for both prime movers, electromagnetic controlling means for such valve mechanism, and a circuit make and break device actuated by the prime movers and controlling the electromagnetic means so as to control the motive medium for both prime movers and start the actuation of the rotating part from any position.

3. The combination of a plurality of prime movers, means actuated thereby, intake and exhaust valves for each prime mover, each intake and corresponding exhaust being connected together so that the closing of either one opens the other, and means for controlling such valves arranged to hold the intake-valves normally closed and the exhaust-valves normally open.

4. The combination of two prime movers, means actuated thereby, intake and exhaust valves for each prime mover, each intake and corresponding exhaust being connected together so that the closing of either one opens the other, resilient means for holding the intake-valves closed, and a controlling-lever arranged to positively open one intake-valve by one movement thereof and to positively open the other intake-valve by a different movement thereof.

5. The combination of a plurality of prime movers, means actuated thereby, intake and exhaust valves for each prime mover, each intake and corresponding exhaust being oppositely arranged on the same stem, so that the closing of either one opens the other, and means for controlling such valves arranged to hold the intake-valves normally closed and the exhaust-valves normally open.

6. The combination of two prime movers, means actuated thereby, intake and exhaust valves for each prime mover, each intake and corresponding exhaust being oppositely arranged on the same stem so that the closing of either one opens the other, resilient means for holding the intake-valves closed, and a controlling-lever arranged to positively open one intake-valve by one movement thereof and to positively open the other intake-valve by a different movement thereof.

7. The combination of two prime movers, means actuated thereby, intake and exhaust valves for each prime mover, each intake and corresponding exhaust being connected together so that the closing of either one opens the other, resilient means for holding the intake-valves closed, and an electromagnetic controlling device including an armature-lever controlling such valves and arranged so that the resilient means of such valves control its movement when the electromagnetic device is deënergized.

8. The combination of two prime movers, means actuated thereby, intake and exhaust valves for each prime mover, each intake and corresponding exhaust being connected together so that the closing of either one opens the other, resilient means for holding the intake-valves closed, and two opposed electromagnets and an armature-lever actuated thereby and controlling such valves in opposition to such resilient means.

9. The combination of a prime mover, means actuated thereby, an intake and an exhaust valve therefor, the intake and exhaust valves being connected together so that the closing of either one opens the other, a feed-duct arranged to supply a motive-medium under pressure, the intake-valve being arranged so that the pressure from the feed-duct tends to hold it closed, resilient means tending to hold the intake-valve closed, and means for controlling such valves.

10. The combination of a prime mover, means actuated thereby, an intake and an exhaust valve therefor, the intake and exhaust valves being connected together so that the closing of either one opens the other, a feed-duct arranged to supply a motive medium under pressure, the intake-valve being arranged so that the pressure from the feed-duct tends to hold it closed, resilient means tending to hold the intake-valve closed, and an electromagnetic controlling device including an armature-lever controlling the valves so as to open the intake-valve in opposition to the pressure and the resilient means.

11. The combination of a plurality of prime movers, means actuated thereby, an intake and an exhaust valve for each prime mover, each intake and corresponding exhaust being connected together so that the closing of either one opens the other, a feed-duct arranged to supply a motive medium under pressure to the prime movers, each intake-valve being arranged so that the pressure from the feed-duct tends to hold it closed, resilient means tending to hold each intake-valve closed, and an electromagnetic controlling device including an armature-lever controlling the valves and arranged so that the resilient means of such valves control its movement when the electromagnetic device is deënergized.

12. The combination of two prime movers, means actuated thereby, a valve mechanism controlling the motive medium for each prime mover, opposed electromagnets and armatures thereof controlling such valve mechanism, the valve mechanism, armatures and electromagnets being arranged so that one armature is normally closer to the poles of its electromagnet than the other.

13. The combination of two prime movers, means actuated thereby, an intake and exhaust valve for each prime mover, opposed electromagnets and armatures and an armature-lever carrying the armatures, the armature-lever controlling the intake and exhaust valves, and resilient means controlling the armature-lever arranged so that the armature-lever normally holds one armature closer to the poles of its electromagnet than the other.

14. The combination of two prime movers, means actuated thereby, an intake and an exhaust valve for each prime mover, each intake and corresponding exhaust being connected together so that the closing of either one opens the other, resilient means for holding the intake-valves closed, opposed electromagnets and armatures and an armature-lever carrying the armatures, the armature-lever controlling the intake-valves so as to open the same in opposition to the resilient means, and the resilient means controlling the armature-lever so as to normally hold one of the armatures in closer proximity to the poles of its electromagnet than the other.

15. The combination of two prime movers, means actuated thereby, an intake and an exhaust valve for each prime mover, each intake and corresponding exhaust being oppositely arranged on the same stem so that the closing of either one opens the other, a feed-duct for motive fluid to the prime movers, each intake-valve being arranged so that the pressure from such feed-duct tends to hold the intake-valve closed, resilient means tending to hold each intake-valve closed, opposed electromagnets and armatures and an armature-lever carrying the armatures, the armature-lever controlling the intake-valves so as to open the same against the pressure and the resilient means, and the resilient means controlling the armature-lever so as to normally hold the armature-lever with one of its armatures in closer proximity to the poles of its electromagnet than the other.

16. The combination of two prime movers, means actuated thereby, a valve mechanism controlling the motive medium for each prime mover, opposed electromagnets and armatures thereof controlling such valve mechanism, the valve mechanism, armatures and electromagnets being arranged so that one armature is normally closer to the poles of its electromagnet than the other, and a circuit make and break device controlling such electromagnetic means and arranged to energize both electromagnets when the prime movers are in intermediate positions and one or the other electromagnet only when the prime movers are in one or the other extreme position.

17. The combination of two prime movers, means actuated thereby, an intake and exhaust valve for each prime mover, opposed electromagnets and armatures and an armature-lever carrying the armatures, the armature-lever controlling the intake and exhaust valves, resilient means controlling the armature-lever arranged so that the armature-lever normally holds one armature closer to the poles of its electromagnet than the other, and a circuit make and break device controlling such electromagnetic means and arranged to energize both electromagnets when the prime movers are in intermediate positions and one or the other electromagnet only when the prime movers are in one or the other extreme position.

18. The combination of two prime movers, means actuated thereby, an intake and an exhaust valve for each prime mover, each intake and corresponding exhaust being connected together so that the closing of either one opens the other, resilient means for holding the intake-valves closed, opposed electromagnets and armatures and an armature-lever carrying the armatures, the armature-lever controlling the intake-valves so as to open the same in opposition to the resilient means, and the resilient means controlling the armature-lever so as to normally hold one of the armatures in closer proximity to the poles of its electromagnets than the other, and a circuit make and break device controlling such electromagnetic means and arranged to energize both electromagnets when the prime movers are in intermediate positions and one or the other electromagnet only when the prime movers are in one or the other extreme position.

19. The combination of two prime movers, means actuated thereby, an intake and an exhaust valve for each prime mover, each intake and corresponding exhaust being oppositely arranged on the same stem so that the closing of either one opens the other, a feed-duct for motive fluid to the prime movers, each intake-valve being arranged so that the pressure from such feed-duct tends to hold the intake-valve closed, resilient means tending to hold each intake-valve closed, opposed electromagnets and armatures and an armature-lever carrying the armatures, the armature-lever controlling the intake-valves so as to open the same against the pressure and the resilient means, and the resilient means controlling the armature-lever so as to normally hold the armature-lever with one of its armatures in closer proximity to the poles of its electromagnet than the other, and a circuit make and break device controlling such electromagnetic means and arranged to energize both electromagnets when the prime movers are in intermediate positions and one or the other electromagnet only when the prime movers are in one or the other extreme position.

20. The combination of two prime movers, means actuated thereby, including a commutator, a valve mechanism controlling the motive medium for each prime mover, opposed electromagnets and armatures thereof controlling such valve mechanism, the valve mechanism, armatures and electromagnets being arranged so that one armature is normally closer to the poles of its electromagnet than the other, and circuit-completing devices coöperating with such commutator in the control of such electromagnetic means and arranged to energize both electromagnets when the prime movers are in intermediate positions and one or the other electromagnet only when the prime movers are in one or the other extreme position.

21. The combination of two prime movers, each adapted to receive reciprocating movement from a motive medium, a rotating part, connecting means between the prime movers and controlling the relative movements thereof so that they are at all times in opposite phases of movement and each prime mover imparts rotative movement to the rotating part, a commutator carried by such connecting means, a valve mechanism controlling the motive medium for each prime mover, opposed electromagnets and armatures thereof controlling such valve mechanism, the valve mechanism, armatures and electromagnets being arranged so that one armature is normally closer to the poles of its electromagnet than the other, and circuit-completing means coöperating with such commutator in the control of such electromagnetic means and arranged to energize both electromagnets when the prime movers are in intermediate position and one or the other electromagnet only when the prime movers are in one or the other extreme position.

In testimony whereof I have affixed my signature in presence of two witnesses.

HENRY BEZER.

Witnesses:
JOHN H. BARNES,
HERBERT H. GIBBS.